Oct. 27, 1970

O. G. PLOS 3,536,424

PUMP AND PISTON ASSEMBLY THEREFOR

Filed Nov. 12, 1968

INVENTOR
OTTO G. PLOS

BY John S. O'Brien

ATTORNEY

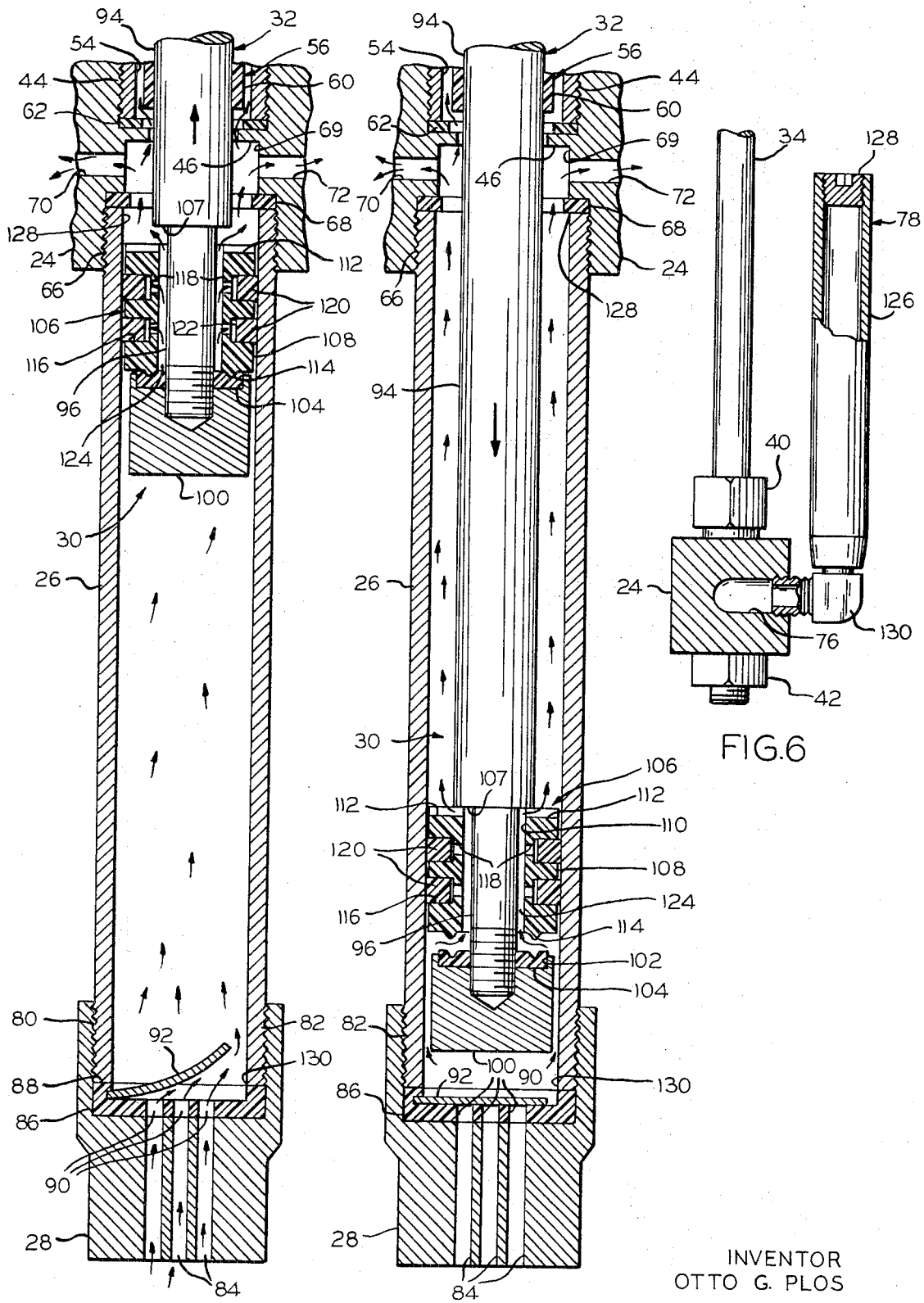

United States Patent Office 3,536,424
Patented Oct. 27, 1970

3,536,424
PUMP AND PISTON ASSEMBLY THEREFOR
Otto G. Plos, Berwyn, Ill., assignor to Hydro-Seal, Ltd., Cicero, Ill., a corporation of Illinois
Filed Nov. 12, 1968, Ser. No. 774,861
Int. Cl. F04b 21/04
U.S. Cl. 417—545                                                20 Claims

ABSTRACT OF THE DISCLOSURE

A double acting reciprocating pump includes a pump cylinder having axially spaced apart inlet and outlet openings, a one-way valve for controlling fluid flow through the inlet opening, a plunger mounted for axial reciprocal movement in the cylinder with one end of the plunger reciprocating between the cylinder openings, a piston sleeve mounted on the plunger end for relative axial movement between the sleeve and the plunger, a passageway between the plunger end and the sleeve for fluid flow past the sleeve, means on the plunger end for closing the outer end of the passageway in an outer position of the sleeve relative to the plunger, an annular groove around the outer periphery of the sleeve, an opening in the sleeve extending between the groove and the passageway for fluid communication therebetween, and an expansible piston ring of pressure-deformable material mounted in the groove. When the plunger is moved in one direction, the valve is opened, the passageway is closed, and the piston ring is expanded against the cylinder by fluid pressure, and when the plunger is moved in the opposite direction, the valve is closed, the passageway is opened, and the piston ring is contracted, for pumping fluid from the outlet opening in both directions of plunger movement.

BACKGROUND OF THE INVENTION

This invention relates to double acting reciprocating pumps, more particularly, to a reciprocating pump of the type in which fluid is caused to flow between opposite sides of a piston head in one direction of piston movement to produce constant flow through an outlet port in both directions of piston movement.

Double acting reciprocating pumps of the type which pass fluid through a piston head in one direction of piston movement suffer from high piston ring wear. The piston rings tend to leak as they wear, especially under high pressure. Worn rings give rise to cylinder scoring. The rings must be replaced frequently, resulting in appreciable down time and labor requirements. Also, the popular pumps employ check valves and/or other moving parts which tend to wear and become clogged, and also provide poor flow through the piston head. Consequently, there is a demand for a pump that will operate efficiently under high pressure for long periods of time without need for ring or packing changes or for other maintenance, and that can be serviced easily and rapidly when necessary.

SUMMARY OF THE INVENTION

The present invention provides a double acting reciprocating pump that is especially advantageous for pumping under high pressures for extended periods of time without need for piston ring changes or other servicing. The pump includes a pump cylinder having axially spaced apart inlet and outlet openings, a one-way valve associated with the cylinder for controlling fluid flow through the inlet opening, a plunger mounted for axial reciprocal movement in the cylinder with one end of the plunger reciprocating between the openings, a piston sleeve mounted on the plunger end for relative axial movement between the sleeve and the plunger, means defining a passageway between the plunger end and the sleeve for fluid flow past the sleeve, means on the plunger end for closing the outer end of the passageway in an outer position of the sleeve relative to the plunger, means forming an annular groove around the outer periphery of the sleeve, means forming an opening in the sleeve extending between the groove and the passageway for fluid communication therebetween, and an expansible piston ring of pressure-deformable material mounted in the groove, whereby upon reciprocation of the plunger under pumping pressure, the valve is alternately opened and closed while the passageway is alternately closed and opened and radially outward fluid pressure on the ring is alternately increased and decreased for alternately expanding and contracting the ring into and out of sealing engagement with the cylinder to thereby pump fluid from the outlet opening in both directions of plunger movement while alternately drawing replacement fluid through the inlet opening and forcing the replacement fluid through the passageway for discharge through the outlet opening.

The invention also provides a piston assembly for a double acting reciprocating pump which includes the plunger, the piston sleeve having the peripheral annular groove and the opening communicating with the groove, and defining the passageway between the plunger and the sleeve, a sleeve retainer on the plunger adapted for closing the passageway, and the piston ring mounted in the groove. A novel sub-assembly for the piston assembly includes the sleeve having the annular groove and the opening communicating with the groove, and the piston ring mounted in the groove.

Piston ring wear is markedly reduced by the invention, owing to ring contraction or relaxation under lowered pressure in one direction of plunger movement, and wear is compensated for by expansion and deformation of the ring. There is no leakage or ring failure under high pressure, and the ring is serviceable until substantially worn through. There is no problem of cylinder scoring. Ring changes are relatively infrequent and are accomplished rapidly when necessary.

The friction load on the pump motor likewise is reduced appreciably. The pump has a low resistance to flow, resulting in a high pump capacity. The pump produces a constant high pressure with even flow. There is no problem of clogging.

The pump structure is simple and economical, employing relatively few parts which have little tendency to wear. The preferred embodiments are especially adapted for use with solvent and particularly paint systems under high pressure.

BRIEF DESCRIPTION OF THE DRAWINGS

The attached drawings illustrate a preferred embodiment of the invention, without limitation thereto. In the drawings, like elements are identified by like reference symbols in each of the views, and:

FIG. 4 is a further enlarged fragmentary longitudinal sectional view of the pump, illustrating its operation in one direction of piston movement;

FIG. 5 is a view like FIG. 4 but illustrating operation of the pump in the opposite direction of piston movement; and FIG. 6 is a sectional view on a smaller scale of a head member in the pump and an elevational and partly broken and sectional view of a pulsation chamber mounted thereon.

DESCRIPTION OF THE PREFERRED EMBODIMENT

Figures 1, 2, 3:
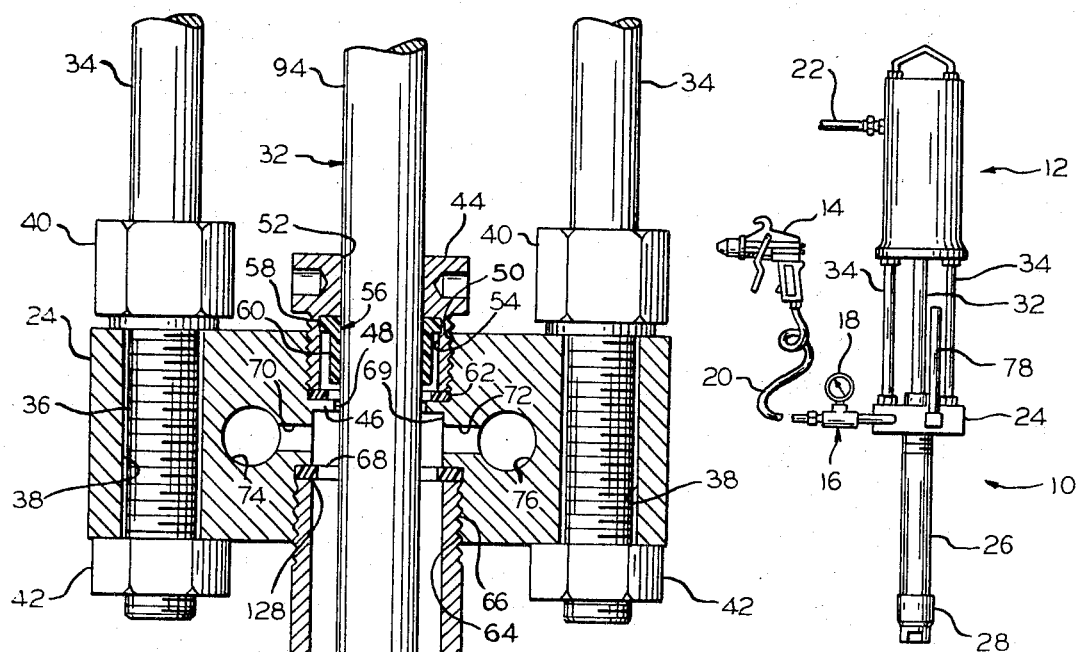
FIG. 1 is an elevational view of a pump according to the invention and a pump motor assembled therewith, illustrating the assembly as it is employed to supply paint under high pressure to a spray gun.
FIG. 2 is an enlarged longitudinal sectional view of the pump.
FIG. 3 is an enlarged perspective view of a sleeve subassembly in the pump.

Referring to FIG. 1 of the drawings, a double acting reciprocating pump 10 according to the invention is shown as assembled with a pump motor 12, and the pump is connected to a paint spray gun 14 by fittings 16 bearing a pressure gauge 18 and by a hose 20. The motor is a conventional air motor having an air line 22 connected thereto.

Referring to FIG. 2, the pump 10 includes a head or junction member 24 in the form of a rectangular block, a pump cylinder 26 in the form of a circular tube joined at one end to the head, a foot or junction member 28 to which the opposite end of the cylinder is joined, and a piston assembly 30 extending through the head member into the cylinder. The piston assembly includes a cylindrical plunger 32 which is connected to the pump motor 12 for axial reciprocation thereby. The pump and the motor are adjustably connected together by tie rods 34 having threaded ends 36 extending through holes 38 in the head member and secured by adjusting nuts 40 and 42 on opposite sides of the head member.

The head member 24 is centrally drilled, reamed, and tapped for insertion of the plunger 32 therethrough and to provide enlarged openings for receiving the pump cylinder 26 and a packing nut 44 therein. An annular flange 46 is formed within the head member, and it defines a circular opening 48 which loosely receives the plunger. An adjacent coaxial enlarged threaded opening 50 on one side of the head member receives the packing nut in threaded engagement therein. The packing nut includes an axial bore 52 loosely receiving the plunger 32, and a counterbore 54 which receives a tubular packing member 56. The packing member includes an annular seating flange 58 inserted at the inner end of the counterbore and extending for the width thereof, and a sealing collar 60 extending along the plunger. A sealing ring 62 is seated on the flange 46, and the packing nut is inserted into abutting engagement therewith. The packing member and the sealing ring are spaced apart to permit entry of fluid into the counterbore 54 on the outside of the packing member. The packing member and the sealing ring preferably are constructed of pressure-deformable material, as subsequently described.

An enlarged threaded opening 64 is provided on the opposite side of the head member, coaxially with the plunger opening 48 and the packing nut opening 50. A threaded end 66 of the pump cylinder 26 is received in the opening 64 in threaded engagement with the head. A sealing ring 68 of pressure-deformable material is inserted at the base of the opening 64, and the cylinder end 66 is inserted into abutting engagement therewith.

A cylindrical outlet chamber 69 is formed in the head member, between the opening 64 for the cylinder and the flange 46. The chamber is coaxial with the pump cylinder 26 and has substantially the same diameter as the inside diameter of the cylinder. An outlet port 70 and a pulsation port 72 are formed in the head member on opposite sides of the chamber, in communication therewith. Enlarged threaded bores 74 and 76 are provided in the head member, in communication with the respective ports 70 and 72. One bore 74 serves for mounting the spray fittings 16, and the other bore 76 serves for mounting a pulsation chamber 78, as illustrated in FIGS. 1 and 6.

The foot member 28 is provided with a recess 80 having the wall thereof threaded for engagement with the threaded opposite end 82 of the pump cylinder 26. Three small cylindrical inlet ports 84 extend through the foot member to the recess 80. A sealing disc 86 of pressure-deformable material and having a peripheral annular ridge 88 is seated in the recess 80, and the pump cylinder is inserted into abutting engagement with the ridge. Three flow openings 90 are provided in the disc, and they register with the inlet ports 84 in the foot member. A reed foot valve member 92 is mounted in the sealing disc 86, with one end of the valve member being inserted in a corresponding groove or slit beneath the ridge 88. The valve member overlies the flow openings 90 and normally closes the openings to prevent passage of fluid therethrough. The valve member may be flexed inwardly to permit fluid flow through the openings.

The plunger 32 includes an elongate cylindrical body 94 connected to the pump motor 12, and a cylindrical end 96 of reduced diameter. The terminal portion 98 of the reduced diameter end is threaded, and a sleeve retainer 100 in the form of a cylindrical nut is mounted in threaded engagement thereon. The retainer is mounted in axially spaced apart relation to the plunger body 94, and in order to preserve the desired spacing, it is preferred to employ pipe threads on the plunger end and the retainer. A counterbore 102 is provided on the inner face of the retainer, and a seating ring 104 of pressure-deformable material is inserted therein.

Referring to FIGS. 2 and 3, a sleeve sub-assembly 106 is mounted on the reduced plunger end 96 for relative axial movement between the sleeve assembly and the plunger, the assembly being movable in the axial direction between a shoulder 107 formed at the outer end of the plunger body 94 and the retainer 100. The sleeve assembly includes a cylindrical piston sleeve 108 having a cylindrical axial bore 110 extending therethrough. Four transverse radial grooves 112 are provided in one end of the sleeve, equiangularly therearound, for communication between the bore and the external surface of the sleeve. An annular ridge 114 is provided on the opposite end of the sleeve.

Two parallel annular grooves 116 are formed in the sleeve around its outer periphery. The grooves are preferably substantially rectangular in cross section, and they are spaced from each other and from the opposite ends of the sleeve. The grooves lie in planes perpendicular to the axis of the sleeve. Circular openings or orifices 118 are formed in the sleeve, extending between the bore 110 and respective peripheral grooves 116. Four radial openings 118 are arranged equiangularly around the sleeve, between each peripheral groove and the bore.

An expansible piston ring 120 of pressure-deformable material is mounted in each peripheral groove 116. The piston rings are split rings preferably rectangular in cross section, of substantially the same width as the peripheral grooves. The rings initially have slightly greater outside diameters than the outside diameter of the sleeve 108, and slightly greater inside diameters than the diameters of the bases of the peripheral grooves 116, thereby leaving annular spaces 122 between the inner surfaces of the rings and the bases of the grooves. In the illustrative preferred embodiment, the outside diameter of the piston sleeve 108 preferably is slightly less than the inside diameter of the pump cylinder 26, e.g., about 0.001 inch, while the piston rings have slightly greater diameters than the inside diameter of the pump cylinder, e.g., about 0.002–0.003 inch greater diameter.

The sleeve bore 110 has a greater diameter than the reduced plunger end 96, to define an annular passageway 124 therebetween for fluid flow past the sleeve. The diameter of the plunger body 94 is greater than the diameter of the bore 110, for limiting relative movement of the sleeve. The grooves 112 on the inner end of the sleeve form outlets for the passageway 124, serving to conduct fluid past the shoulder 107 formed at the junction of the plunger body 94 and its reduced end 96. The annular ridge 114 on the outer end of the sleeve is arranged for sealing engagement with the seating ring 104 carried by the sleeve retainer 100. The sleeve retainer 100 has a diameter appreciably less than the inside diameter of the pump cylinder 26, for fluid flow therebetween.

Referring to FIG. 6, the pulsation chamber 78 includes a cylindrical tube 126 having one end closed by a nut 128 in threaded engagement therein. An elbow 130 is inserted into the opposite end of the tube in threaded engagement therewith, and also the threaded bore 76 registering with the pulsation port 72 in the head member 24.

The pressure-deformable material of which the several packing, sealing, seating and ring members is formed preferably is a thermoplastic synthetic resin capable of cold flow under pump pressure, or the material may be an elastomer such as rubber. Suitable resinous materials capable of cold flow include polytetrafluoroethylene (Teflon), polyethylene, and polyvinylacetal (Delrin). Polytetrafluoroethylene is eminently suitable and is self-lubricating, and, therefore, is preferred.

The remaining parts of the pump may be constructed of suitable metals. It is frequently preferred, however, to construct the piston sleeve 108 of a thermoplastic synthetic resin not subject to substantial cold flow under pump pressure, such as nylon. With such construction, cylinder scoring is substantially eliminated.

The opposite ends 66 and 82 of the pump cylinder 26 define outlet and inlet openings 128 and 130 communicating with the outlet and pulsation ports 70 and 72, and with the inlet ports 84, respectively. The plunger 32 is mounted for axial reciprocal movement in the cylinder with its reduced diameter end 96, the sleeve sub-assembly 106 and the retainer 100 thereon reciprocating between the outlet and inlet openings, as illustrated in FIGS. 4 and 5.

During the upstroke or outward movement of the piston assembly 30, illustrated in FIG. 4, fluid is pumped from the cylinder out of the outlet port 70 to the spray gun 14, while replacement fluid is drawn into the cylinder through the inlet ports 84. At the same time, air trapped in the pulsation chamber 78 is compressed by the introduction of fluid thereinto. During the downstroke or inward movement of the piston assembly 30, illustrated in FIG. 5, the replacement fluid is forced past the sleeve sub-assembly 106, and pumping through the outlet port 70 continues. The air in the pulsation chamber is again compressed. The pressure in the pulsation chamber 78 assists in providing continuous even flow, being exerted to continue the pumping of fluid each time the direction of movement of the piston assembly is reversed. The manner in which the pumping action is achieved will now be described.

The piston rings 120 preferably are split rings, as illustrated, formed of resinous material capable of cold flow, as described above. When they are subjected to internal pressure, they expand, and the material flows to fill the space created by separation of the ring ends, to provide a liquid-tight seal. During the upstroke, illustrated in FIG. 4, and with the pump primed, the sleeve 108 is seated on the retainer 100 under the force of hydraulic pressure created by movement of the piston assembly 30, and the ridge 114 on the outer end of the sleeve is pressed into the seating ring 104 to form a seal. In this manner, the retainer closes the adjacent outer end of the fluid passageway 124. The fluid in the passageway is subjected to high hydraulic pressure, which is exerted radially through the sleeve openings 118, in the spaces 122 behind the piston rings, and against the inner surfaces of the rings. The rings are expanded and urged by a strong force into sealing engagement with the inner surface of the pump cylinder 26, preventing any leakage past the rings. Consequently, fluid above the sleeve assembly 106 is pumped out of the outlet port 70 to the spray gun 14 under high pressure, e.g., up to 2,000 lbs. per square inch gauge. Corresponding pressure is built up in the pulsation chamber 78.

With the cylinder 26 inserted into a container of fluid such as paint, which is under atmospheric pressure, the upward movement of the piston assembly 30 serves to draw the fluid through the inlet ports 84, through the flow openings 90 and past the valve member 92, which is flexed and raised in the process to open the valve. The cylinder is filled with replacement fluid below the sleeve assembly 106.

When the direction of movement of the piston assembly is reversed, pressure exerted from within the pulsation chamber 78 acts to maintain the pressure on the fluid above the sleeve assembly for continued pumping.

As the plunger 32 is inserted into the cylinder 26 during the downstroke, illustrated in FIG. 5, the valve member 92 is closed by hydraulic pressure, to close the inlet ports 84. Pressure builds up rapidly beneath the sleeve assembly 106. The plunger moves while movement of the sleeve assembly is resisted by fluid pressure against the outer end of the sleeve, until the sleeve abuts against the shoulder 107, and is spaced from the retainer 100. The fluid pressure in the passageway 124 is reduced, reducing the pressure on the inner surfaces of the piston rings 120 and allowing the rings to contract or relax their sealing pressure on the cylinder.

Fluid is forced past the retainer, through the passageway 124, and through the outlet grooves 112 in the sleeve 108 to the space in the pump cylinder above the sleeve assembly. Insertion of the plunger body 94 into the cylinder displaces fluid from the cylinder and pumps it out of the outlet port 70 to the spray gun 14 under high pressure.

The cross sectional area of the plunger body 94 is one-half of the internal cross sectional area of the cylinder, so that pumping pressure and volume are equal for the upstroke and the downstroke. At the end of the downstroke and reversal of movement of the piston assembly, the pressure built up in the pulsation chamber 78 once more acts to maintain the pressure on the system until full pressure is achieved on the upstroke. Pumping continues in the foregoing manner, as needed to maintain the pressure in the system.

With the piston rings 120 sealed by fluid pressure in the foregoing manner, they need not be substantially oversize as with prior fixed rings. Consequently, the piston assembly 30 is readily inserted in the cylinder 26 during pump assembly. During pumping, the rings are urged against the cylinder wall on the upstroke with much higher force than in the case of fixed oversize rings. As the rings wear, they are continually expanded, and they cold flow to form a continuous seal. The sides of the peripheral grooves 116 on the sleeve meanwhile retain the rings and prevent them from flowing or deforming other than in the desired directions. The rings continue to function in this manner until they are substantially worn through. Employing polytetrafluoroethylene as the preferred ring material, the rings are also self-lubricating. The piston sleeve 108 is constantly centered in the cylinder, preventing scoring thereby. Scoring is further precluded by forming the sleeve of nylon as a preferred material.

During the downstroke, with the piston rings 120 contracted, ring wear is greatly reduced to very little wear, substantially doubling the service life of the rings. The friction load on the motor likewise is reduced, increasing the efficiency of operation.

The piston assembly provides relatively low resistance to fluid flow, and a high pump capacity is achieved. Obstructions to flow are minimized in fluid passage around the retainer 100, through the passageway 124, and through the outlet grooves 112. A ratio of fluid pressure being pumped to operating air pressure of 36:1 may be provided. The piston assembly suffers from almost negligible wear other than ring wear, and the parts do not become clogged.

The provision of pressure-deformable sealing parts provides tight seals at the several junctions and requires only hand-tight assembly of the parts. Thus, the seating ring 104 is loosely inserted in the retainer 100, and the fluid pressure serves to maintain a tight seal with the sleeve 108 during the upstroke. Employing cold flow material, the ring is deformed to preserve the seal. Similarly, the sealing ring 68 and the sealing disc 86 at the opposite ends of the pump cylinder 26 cold flow under pressure to form tight seals.

The sealing ring 62 for the packing nut 44 likewise cold flows under fluid pressure to form a tight seal. Fluid under pressure communicates with the counterbore 54 in the packing nut, through the shaft opening 48 and between the sealing ring 62 and the packing member 56, to exert pumping pressure against the outer surface of the packing member. In this manner, the packing member of deformable material forms a tight seal around the plunger body 94 during pumping.

Construction of the piston rings and of the several sealing members of resinous cold flow material, particularly polytetrafluoroethylene, is preferred for long reliable service, especially for use with systems containing solvents, such as paints. Other expansible and deformable articles may be employed in applications where solvent attack is not a factor. Thus, piston rings and sealing members may be constructed of elastomers such as rubber. In this case, the piston rings need not be split for mounting on the piston sleeve. Even in such applications, however, polytetrafluoroethylene is advantageous by virtue of its self-lubricating properties. Also, loss of resiliency is no problem, and constant tight sealing by cold flow is assured.

The piston rings 120 ultimately wear through and must be replaced. However, their long service life requires but infrequent replacement. The pump cylinder 26 then is removed from the head member 24, which requires little force, and is separated from the piston assembly 30. The sleeve retainer 100 is removed from the plunger end 96, also requiring little force. A prepared sleeve sub-assembly 106 then may be used to replace the used assembly. The retainer is secured on the plunger end, and the cylinder is slipped over the end of the piston assembly and threaded into the head member 24, all requiring little force. The pump is returned to service in a matter of minutes, whereas as much as one to two hours have been required for paint pump maintenance in the past. The worn piston rings 120 in the used sleeve assembly may be replaced when convenient, also requiring only several minutes for removing the rings and mounting new rings in the peripheral grooves 116.

It will be evident that the pump 10 and especially the piston assembly 30 thereof is readily and economically manufactured. Thus, the piston assembly is constructed of a cylindrical rod turned down at one end to provide the reduced diameter end 96, threaded in the terminal portion 98, and threaded at the opposite end (not shown) for connection to the pump motor 12. The sleeve retainer 100 constitutes a simple nut having a counterbore 102. The piston sleeve 108 is a cylindrical member readily provided with the bore 110, the grooves 112 at one end, the ridge 114 at the opposite end, the peripheral grooves 116, and the radial openings 118. The split rings 120 are readily made. The head member 24 may be drilled, reamed and tapped, or may be a casting, as desired. The pump structure thus is simple and economical to construct while operating very efficiently under high pressure over a long service life with very little maintenance. The wear, clogging, and pump failure experienced with prior pumps are obviated while pump efficiency and capacity are markedly improved.

While a preferred embodiment of the invention has been illustrated and described, it will be appaarent to those skilled in the art that various changes and modifications may be made therein within the spirit and scope of the invention. It is intended that such changes and modifications be included within the scope of the appended claims.

I claim:
1. A double acting reciprocating pump which comprises
   a pump cylinder having axially spaced apart inlet and outlet openings,
   a one-way valve means associated with said cylinder for controlling fluid flow through said inlet openings,
   a plunger mounted for axial reciprocal movement in said cylinder and one end of said plunger reciprocating between said openings,
   a piston sleeve mounted on said plunger end for relative axial movement between the sleeve and the plunger,
   means defining a passageway between said plunger end and said sleeve for fluid flow past the sleeve,
   means on said plunger end for closing the outer end of said passageway in an outer position of said sleeve relative to said plunger,
   means forming an annular groove around the outer periphery of said sleeve,
   means forming an opening in said sleeve extending between said groove and said passageway for fluid communication therebetween, and
   an expansible piston ring of pressure-deformable material mounted on said groove,
   whereby upon reciprocation of said plunger under pumping pressure, said valve is alternately opened and closed while said passageway is alternately closed and opened and radially outward fluid pressure on said ring is alternately increased and decreased for alternately expanding and contracting said ring into and out of sealing engagement with said cylinder to thereby pump fluid from said outlet opening in both directions of plunger movement while alternately drawing replacement fluid through said passageway for discharge through said outlet opening.
2. A pump as defined in claim 1 wherein said piston ring material is a thermoplastic synthetic resin capable of cold flow under pump pressure.
3. A pump as defined in claim 2 wherein said resin is polytetrafluoroethylene.
4. A pump as defined in claim 1 wherein said piston ring material is an elastomer.
5. A pump as defined in claim 1 wherein said piston sleeve is formed of a thermoplastic synthetic resin not subject to substantial cold flow under pump pressure.
6. A pump as defined in claim 5 wherein said piston sleeve is formed of nylon.
7. A pump as defined in claim 1 wherein said plunger end is cylindrical, and said piston sleeve has a cylindrical bore of greater diameter than said plunger end, thereby defining an annular fluid passageway therebetween.
8. A pump as defined in claim 7 wherein said plunger includes an elongate cylindrical body adjacent said plunger end.
9. A piston assembly for a double acting reciprocating pump which comprises
   a plunger having an elongate cylindrical body and a cylindrical end of reduced diameter,
   a piston sleeve mounted on said plunger end for relative axial movement between the sleeve and the plunger, said sleeve having a cylindrical bore of greater diameter than said plunger end to define an annular passageway between them for fluid flow past the sleeve, said plunger body having a greater diameter than said bore for limiting said relative movement,
   a sleeve retainer mounted on said plunger end in axially spaced apart relation to said plunger body and adapted for closing the adjacent end of said passageway when said sleeve is positioned adjacent thereto,
   means forming an annular groove around the outer periphery of said sleeve,
   means forming an opening in said sleeve extending from said groove to said bore for fluid communication between the groove of said passageway, and an expansible piston ring of pressure-deformable material mounted in said groove, whereby said plunger is adapted for axial reciprocation in a pump cylinder with said passageway closed and said ring expanded against the cylinder by fluid pressure in one direction of plunger movement, and with said passageway opened and said ring contracted in the opposite direction of plunger movement, for pumping fluid in unidirectional flow in both directions of plunger movement.

10. A piston assembly as defined in claim 9 wherein said piston ring material is a thermoplastic synthetic resin capable of cold flow under pump pressure.

11. An assembly as defined in claim 9 wherein said piston ring is a split ring formed of polytetrafluoroethylene.

12. An assembly as defined in claim 11 wherein said piston sleeve is formed of nylon.

13. An assembly as defined in claim 9 wherein said sleeve retainer is a nut member in threaded engagement with said plunger end.

14. An assembly as defined in claim 13 including a gasket carried by said nut member for sealing engagement with said piston sleeve.

15. A sleeve sub-assembly for a double acting reciprocating pump piston assembly which comprises a cylindrical piston sleeve having an axial bore therethrough, means forming an annular groove around the outer periphery of said sleeve, means forming an opening in said sleeve extending from said groove to said bore, and an expansible piston ring of pressure-deformable material mounted in said groove, whereby said sleeve is adapted for mounting on a plunger for relative axial movement between them and to provide a passageway between them for fluid flow past the sleeve with said groove in fluid communication with said passageway for transmitting fluid pressure from the passageway to said piston ring.

16. An assembly as defined in claim 15 wherein said piston ring is a split ring formed of polytetrafluoroethylene.

17. An assembly as defined in claim 15 wherein said piston sleeve is formed of nylon.

18. An assembly as defined in claim 15 including groove means on one end of said piston sleeve extending transversely from said bore for conducting fluid therefrom.

19. An assembly as defined in claim 18 including an annular ridge on the opposite end of said sleeve for engagement with an annular gasket.

20. A sleeve sub-assembly for a double acting reciprocating pump piston assembly which comprises a cylindrical piston sleeve having a cylindrical axial bore therethrough, groove means on one end of said sleeve extending transversely from said bore, means forming an annular groove around the outer periphery of said sleeve, means forming an opening in said sleeve extending from said groove to said bore, and a split piston ring formed of polytetrafluoroethylene mounted in said groove, whereby said sleeve is adapted for mounting on a reduced diameter cylindrical end of a cylindrical plunger for relative axial movement between the sleeve and the plunger and to provide a passageway between them for fluid flow past the sleeve with said groove in fluid communication with said passageway for transmitting fluid pressure from the passageway to said piston ring.

References Cited

UNITED STATES PATENTS

| 2,116,684 | 5/1938 | MacGregor | 103—192 |
| 2,396,878 | 3/1946 | Plumb | 103—178 |
| 2,610,098 | 9/1952 | Reiners | 92—182 |
| 2,991,003 | 7/1961 | Peterson | 92—252 XR |
| 3,155,014 | 11/1964 | Genz | 92—252 XR |

ROBERT M. WALKER, Primary Examiner

UNITED STATES PATENT OFFICE
CERTIFICATE OF CORRECTION

Patent No. 3,536,424                    Dated     October 27, 1970

Inventor(s)     Otto G. Plos

It is certified that error appears in the above-identified patent and that said Letters Patent are hereby corrected as shown below:

Column 8, line 7, "openings" should read -- opening --; line 25, "on" should read -- in --; line 35, after "said" insert -- inlet opening and forcing the replacement fluid through said --; line 75, "of" should read -- and --.

Signed and sealed this 1st day of August 1972.

(SEAL)
Attest:

EDWARD M. FLETCHER, JR.                 ROBERT GOTTSCHALK
Attesting Officer                       Commissioner of Patents